United States Patent
P (10) Patent No.: US 9,231,959 B2
(45) Date of Patent: Jan. 5, 2016

(54) MULTIPLE TRANSACTION INTERFACE FRAMEWORK

(71) Applicant: Meenakshi Sundaram P, Walldorf (DE)

(72) Inventor: Meenakshi Sundaram P, Walldorf (DE)

(73) Assignee: SAP SE, Walldorf (DE)

( * ) Notice: Subject to any disclaimer, the term of this patent is extended or adjusted under 35 U.S.C. 154(b) by 12 days.

(21) Appl. No.: 13/941,147

(22) Filed: Jul. 12, 2013

(65) Prior Publication Data

US 2015/0020156 A1    Jan. 15, 2015

(51) Int. Cl.
*H04L 9/32* (2006.01)
*H04L 29/06* (2006.01)

(52) U.S. Cl.
CPC .......... *H04L 63/105* (2013.01); *H04L 63/0209* (2013.01); *H04L 63/102* (2013.01); *H04L 67/40* (2013.10); *H04L 9/32* (2013.01)

(58) Field of Classification Search
CPC ........................................................ H04L 9/32
USPC ............................................................ 726/3
See application file for complete search history.

(56) References Cited

U.S. PATENT DOCUMENTS

| | | | |
|---|---|---|---|
| 5,613,012 A * | 3/1997 | Hoffman et al. | 382/115 |
| 7,143,079 B2 | 11/2006 | Pauly et al. | |
| 7,418,628 B2 | 8/2008 | Arend | |
| 7,633,864 B2 | 12/2009 | Johnson et al. | |
| 7,725,371 B2 | 5/2010 | Wernze et al. | |
| 7,870,561 B2 | 1/2011 | Nogge et al. | |
| 8,055,777 B2 | 11/2011 | Noda et al. | |
| 8,214,239 B2 | 7/2012 | Goldberg et al. | |
| 8,370,521 B2 | 2/2013 | Lamba et al. | |
| 2010/0131616 A1 | 5/2010 | Walter et al. | |
| 2010/0318802 A1 * | 12/2010 | Balakrishnan | 713/172 |
| 2010/0332665 A1 | 12/2010 | Jolfaei | |
| 2012/0041922 A1 | 2/2012 | Vainer et al. | |
| 2012/0124645 A1 | 5/2012 | Ratica et al. | |
| 2012/0246130 A1 | 9/2012 | Schmidt | |
| 2013/0031203 A1 | 1/2013 | Bestfleisch et al. | |
| 2013/0119130 A1 * | 5/2013 | Braams | 235/382 |

FOREIGN PATENT DOCUMENTS

WO    WO-2013041908 A1    3/2013

* cited by examiner

*Primary Examiner* — Jacob Lipman
(74) *Attorney, Agent, or Firm* — Schwegman Lundberg & Woessner, P.A.

(57) ABSTRACT

Example methods and systems are directed to a multiple transaction interface framework. A system may comprise three computing devices. The first computing device may be accessible to a plurality of users. The second computing device may be inaccessible to the plurality of users, but accessible by a user account of the first computing device. The third computing device may be inaccessible to the plurality of users, and inaccessible by the user account of the first computing device, but accessible by a user account of the second computing device. In some example embodiments, the first computing device causes a user interface to be presented. The user interface may include data retrieved from the second computing device. The data may have been retrieved by the second computing device from the third computing device, which may be configured to store the data.

20 Claims, 10 Drawing Sheets

MULTIPLE TRANSACTION INTERFACE FRAMEWORK

TECHNICAL FIELD

The subject matter disclosed herein generally relates to the processing of data. Specifically, the present disclosure addresses systems and methods to provide a framework for handling multiple transactions.

BACKGROUND

A service provider may make a server application available over a public network. Alternately, a service provider may restrict access to the server application. A publicly accessible server application may have security vulnerabilities not present in a restricted access server application.

BRIEF DESCRIPTION OF THE DRAWINGS

Some embodiments are illustrated by way of example and not limitation in the figures of the accompanying drawings.

DETAILED DESCRIPTION

Example methods and systems are directed to a multiple transaction interface framework. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A system may comprise three computing devices. The first computing device may be accessible to a plurality of users (e.g., be publicly accessible, be accessible to users having certain credentials, or both). The second computing device may be inaccessible to the plurality of users (e.g., by rejecting login attempts from the users, by not being connected to the same network as the users, or both), but accessible by a user account of the first computing device (e.g., through different user credentials, by using a separate network connection, or both). The second computing device may also be accessible by a different plurality of users (e.g., by using different login credentials, by being connected over a different network, or both). The third computing device may be inaccessible to the plurality of users (e.g., by rejecting login attempts from the users, by not being connected to the same network as the users, or both), and inaccessible by the user account of the first computing device, but accessible by a user account of the second computing device (e.g., through different user credentials, by using a separate network connection, or both).

In some example embodiments, the first computing device causes a user interface ("UI") to be presented to a user accessing the first computing device. The UI may include data retrieved from the second computing device. The data may have been retrieved by the second computing device from the third computing device, which may be configured to store the data.

Figure 1:
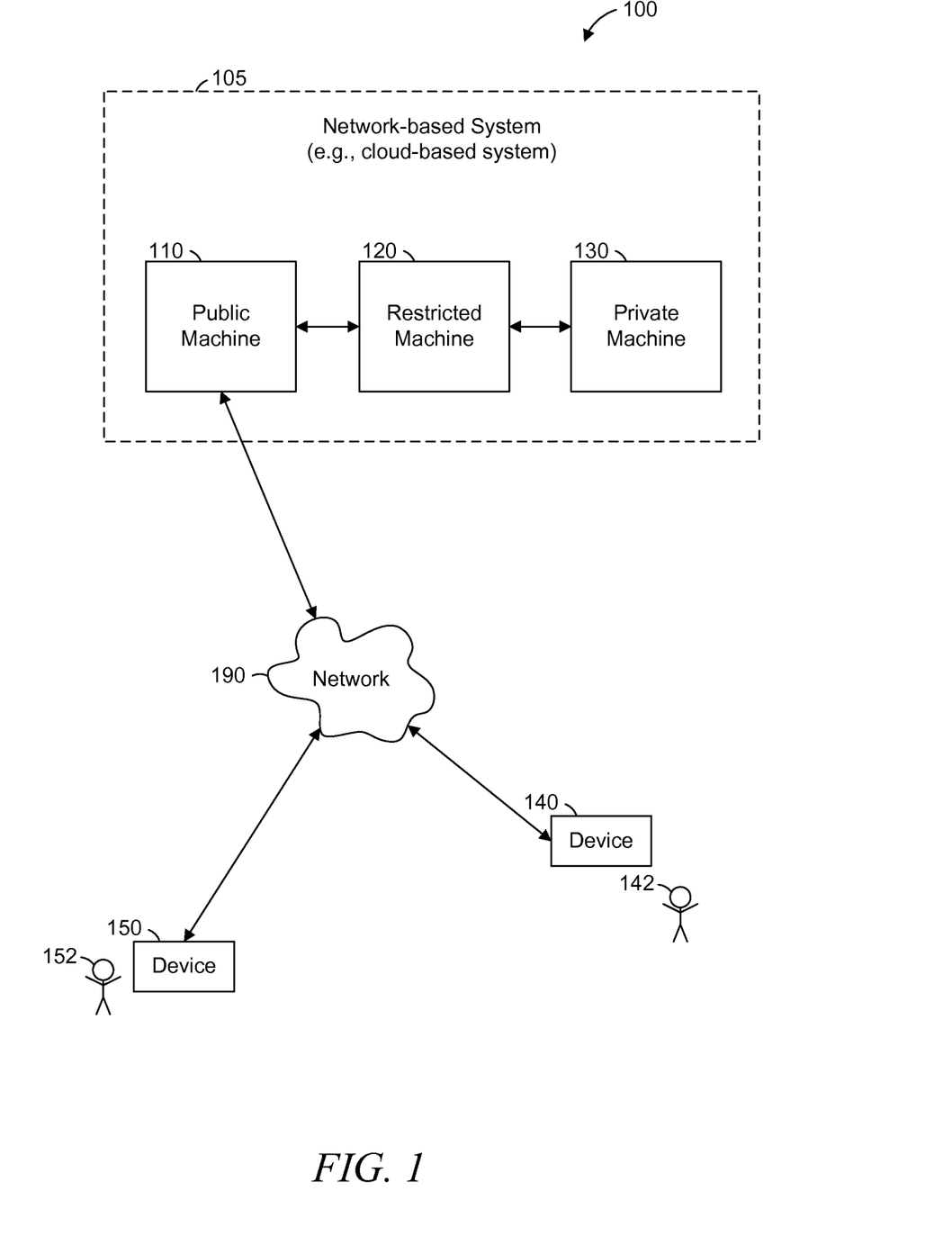
FIG. 1 is a network diagram illustrating a network environment suitable for implementing a multiple transaction interface framework, according to some example embodiments.

FIG. 1 is a network diagram illustrating a network environment suitable for implementing a multiple transaction interface framework, according to some example embodiments. The network environment 100 includes a public machine 110, a restricted machine 120, a private machine 130, and devices 140 and 150, all communicatively coupled to each other via a network 190. The network-based system 105 may comprise the three machines 110, 120, and 130, and may present a single interface to the network 190. The machines 110, 120, and 130 and the devices 140 and 150 may each be implemented in a computer system, in whole or in part, as described below with respect to FIG. 10.

The devices 140, 150 may present UIs to show data received from the public machine 110, to generate requests to the public machine 110, or both. The public machine 110 may be accessible by the devices 140, 150 via the network 190. Requests from the devices 140, 150 may be responded to with data stored on the public machine 110, may prompt the public machine 110 to request data from the restricted machine 120, or both. The restricted machine 120 may be accessible by the public machine 110 and be inaccessible by the devices 140, 150 via the network 190. Requests to the restricted machine 120 from the public machine 110 may be responded to with data stored on the restricted machine 120, may prompt the restricted machine 120 to request data from the private machine 130, or both. The private machine 130 may be accessible by the restricted machine 120 and inaccessible by the devices 140, 150 and the public machine 110. The private machine 130 may store data and use it to respond to requests from the restricted machine 120.

Also shown in FIG. 1 are users 142 and 152. One or both of the users 142 and 152 may be a human user, a machine user (e.g., a computer configured by a software program to interact with the device 140), or any suitable combination thereof (e.g., a human assisted by a machine or a machine supervised by a human). The user 142 is not part of the network environment 100, but is associated with the device 140 and may be a user of the device 140. For example, the device 140 may be a desktop computer, a vehicle computer, a tablet computer, a navigational device, a portable media device, or a smart phone belonging to the user 142. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the public machine 110 and the device 140). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
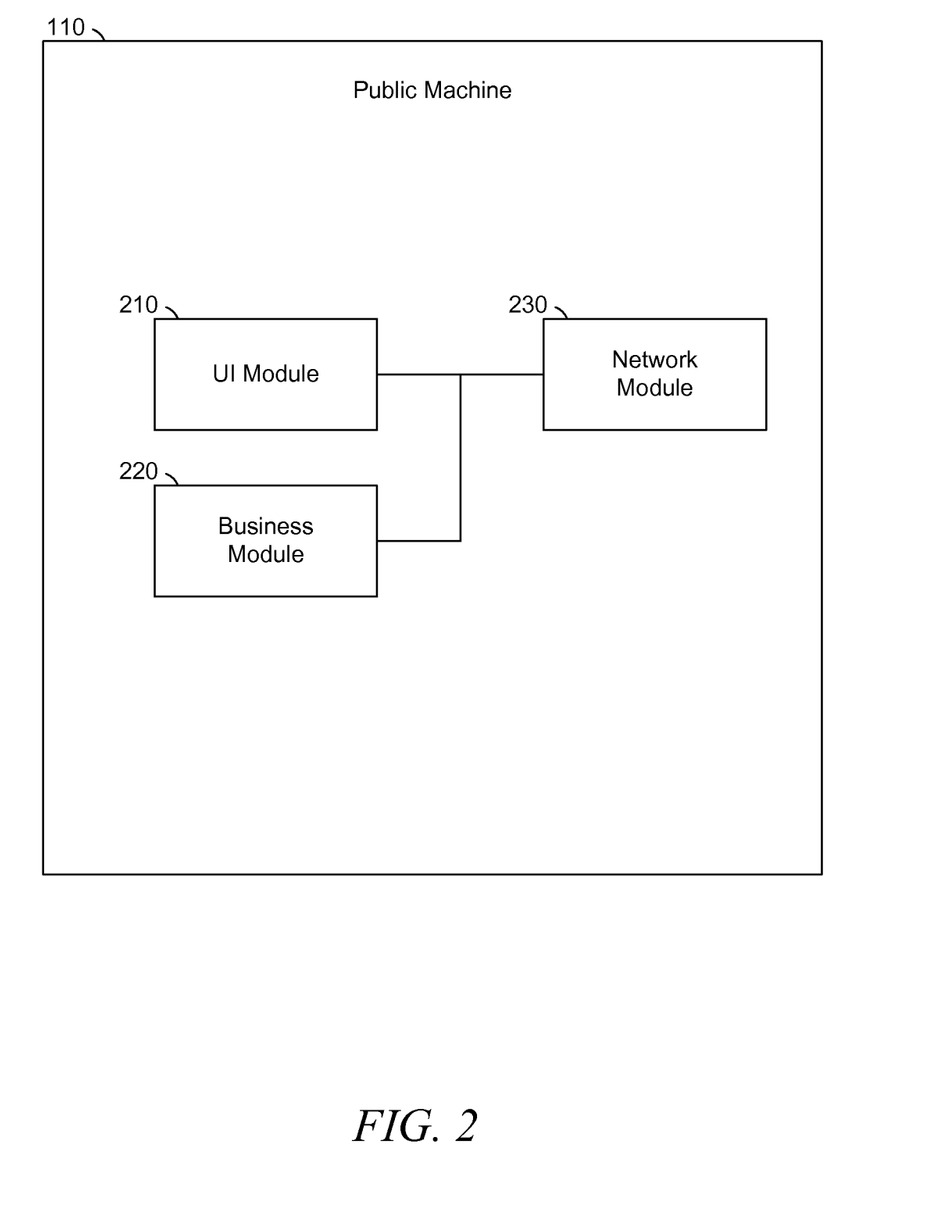
FIG. 2 is a block diagram illustrating components of a public machine suitable for implementing a multiple transaction interface framework, according to some example embodiments.

FIG. 2 is a block diagram illustrating components of a public machine suitable for implementing a multiple transaction interface framework, according to some example embodiments. The public machine 110 is shown as including a UI module 210, a business module 220, and a network module 230, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The UI module 210 may cause a UI (e.g., an application interface, a web browser interface, or both) to be presented to a user accessing the public machine 110. The UI may be operable to request data from the public machine 110 via the network module 230. The business module 220 may process the request and generate a request for the responsive data. The network module 230 may send the request for the responsive data to the restricted machine 120 and receive responsive data from the restricted machine 120. The business module 220 may process the responsive data and may prepare it for presentation. The UI module 210 may present the responsive data to the user.

Figure 3:
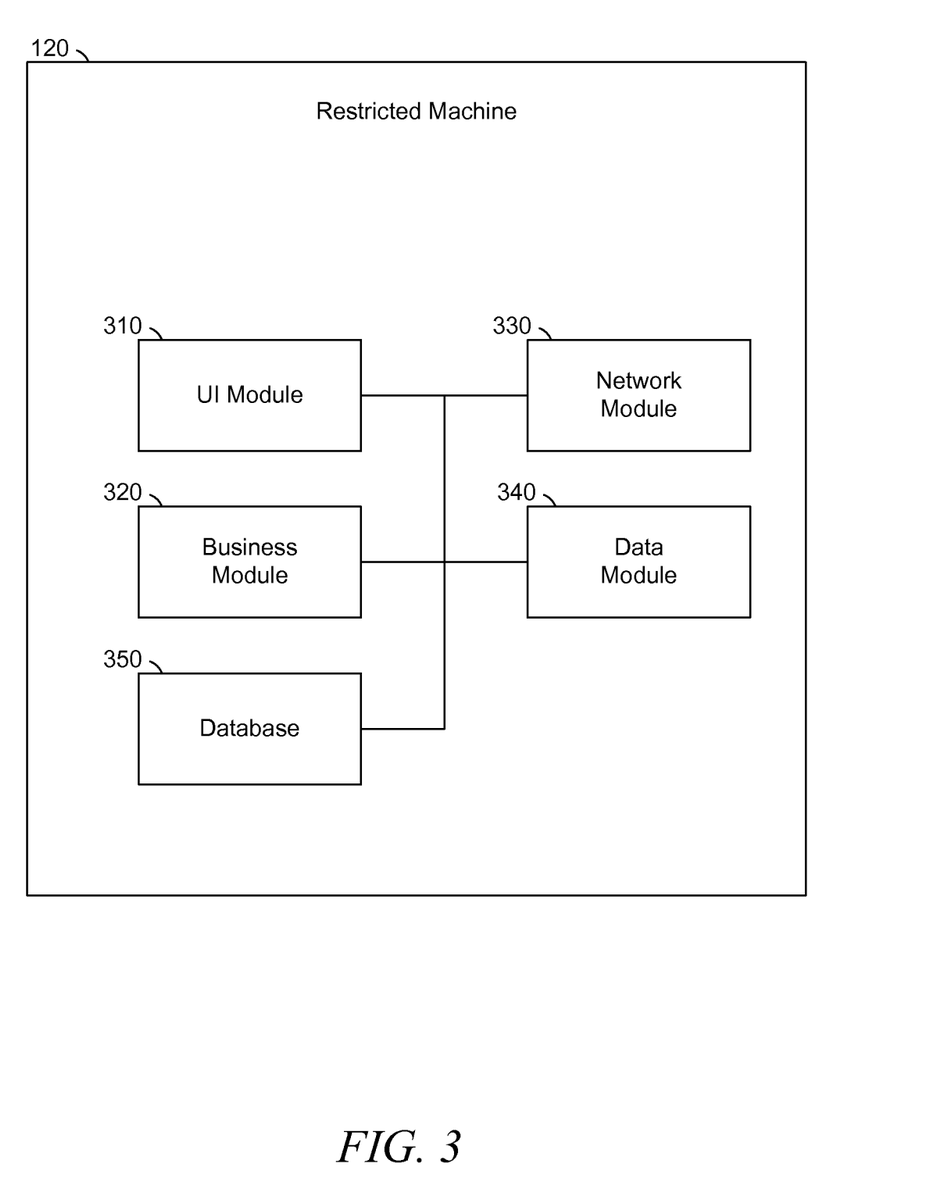
FIG. 3 is a block diagram illustrating components of a restricted machine suitable for implementing a multiple transaction interface framework, according to some example embodiments.

FIG. 3 is a block diagram illustrating components of a restricted machine suitable for implementing a multiple transaction interface framework, according to some example embodiments. The restricted machine 120 is shown as including a UI module 310, a business module 320, a network module 330, a data module 340, and a database 350, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The UI module 310 may cause a UI (e.g., an application interface, a web browser interface, or both) to be presented to a user accessing the restricted machine 120. The UI may be operable to request data from the private machine 130 via the network module 330. The user device may access the restricted machine 120 through a different network than the network 190. Requests may also be received via the network module 330 (e.g., from the public machine 110). The business module 320 may process the request and generate a request for the responsive data. The data module 340 may determine that the responsive data is stored in the database 350 and supply the responsive data from the database 350. In some example embodiments, the network module 330 may send the request for the responsive data to the private machine 130, and receive responsive data from the private machine 130. The data module 340 may store the responsive data in the database 350. The business module 320 may process the responsive data and may prepare it for presentation. When the request is received through the UI module 310, the UI module 310 may present the responsive data to the user. When the request is received through the network module 330, the network module 330 may respond with the responsive data.

Figure 4:
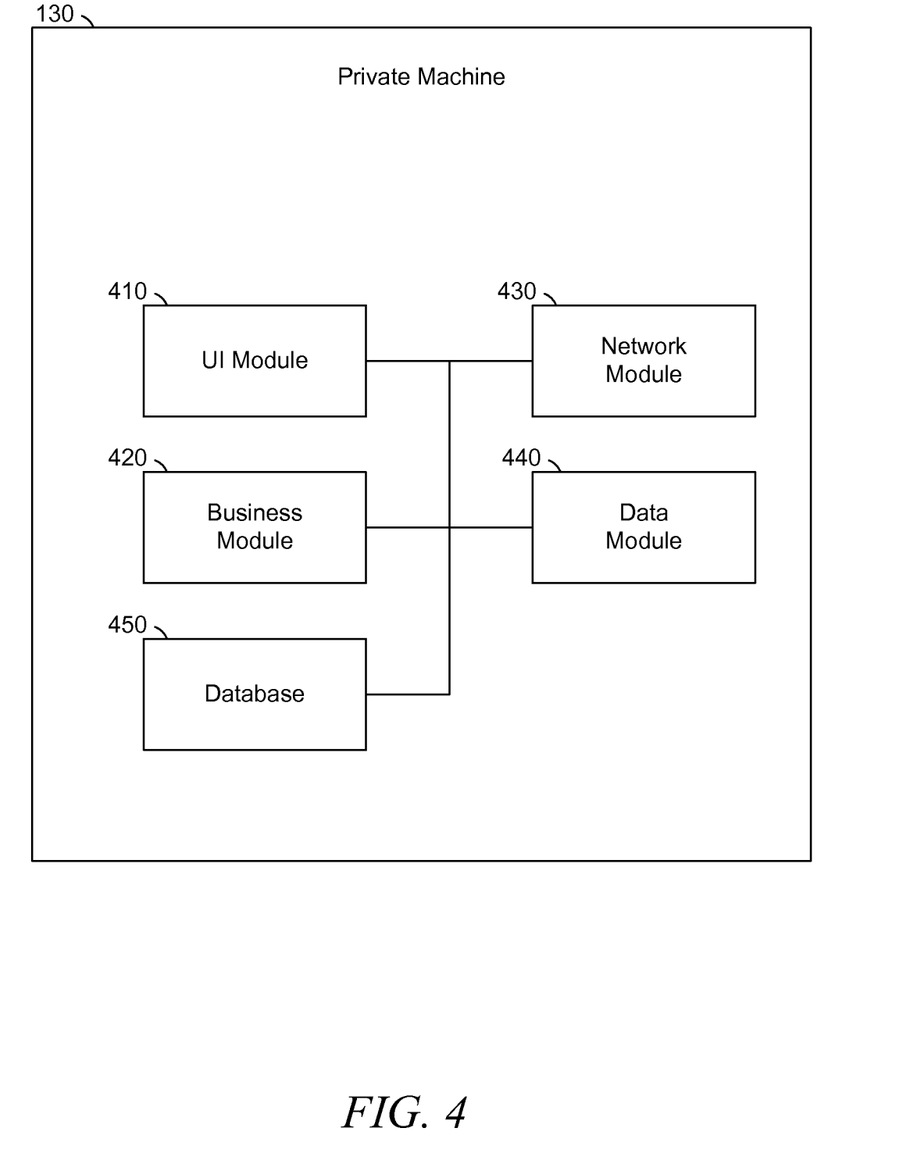
FIG. 4 is a block diagram illustrating components of a private machine suitable for implementing a multiple transaction interface framework, according to some example embodiments.

FIG. 4 is a block diagram illustrating components of a private machine suitable for implementing a multiple transaction interface framework, according to some example embodiments. The private machine 130 is shown as including a UI module 410, a business module 420, a network module 430, a data module 440, and a database 450, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The UI module 410 may cause a UI (e.g., an application interface, a web browser interface, or both) to be presented to a user accessing the private machine 130. The UI may be operable to request data from the private machine 130. The user device may access the private machine 130 through a different network than the network 190. Requests may also be received via the network module 430 (e.g., from the restricted machine 120). The business module 420 may process the request and generate a request for the responsive data. The data module 440 may determine that the responsive data is stored in the database 450 and supply the responsive data from the database 450. The business module 420 may process the responsive data and may prepare it for presentation. When the request is received through the UI module 410, the UI module 310 may present the responsive data to the user. When the request is received through the network module 430, the network module 430 may respond with the responsive data.

Figure 5:
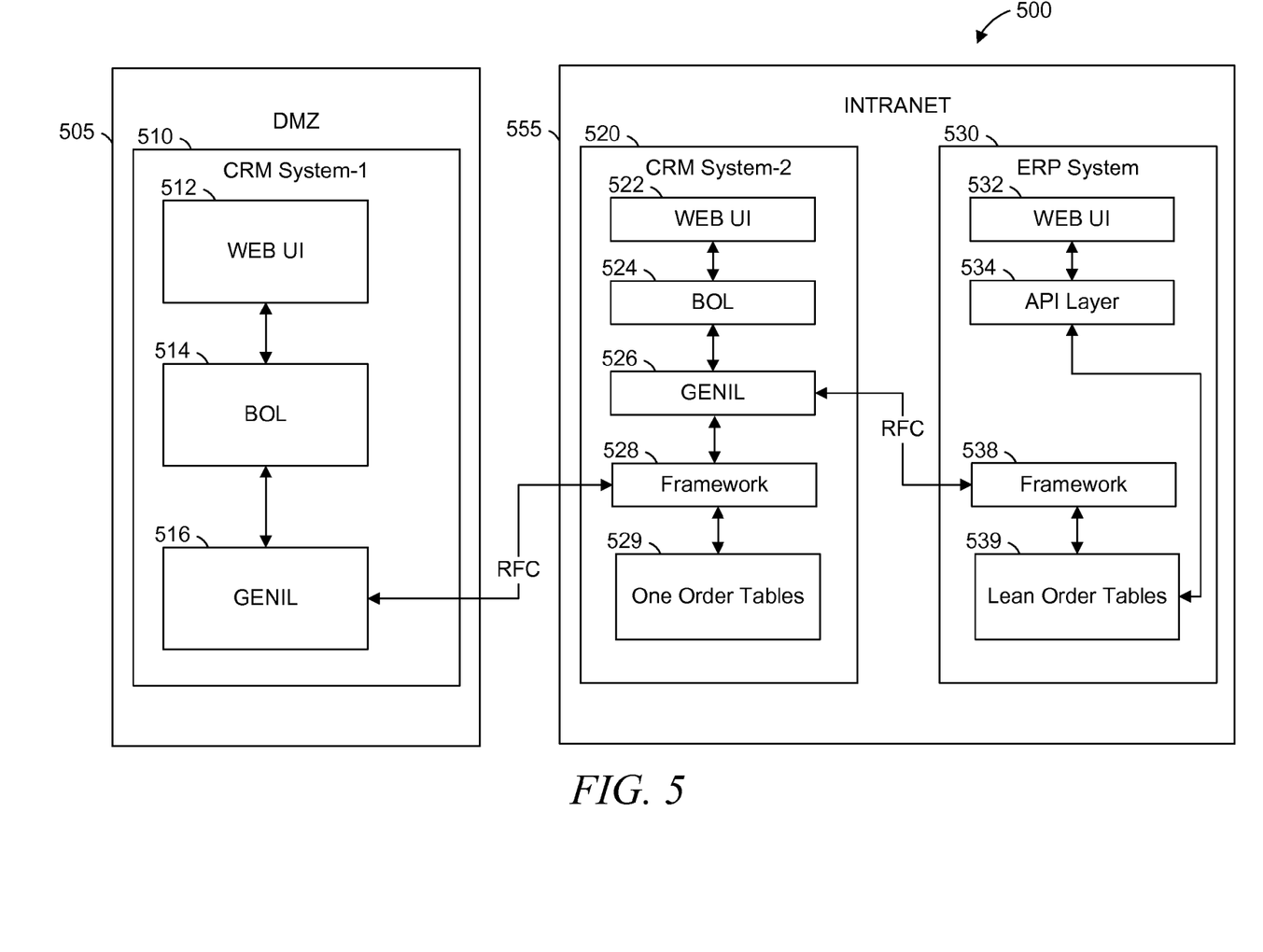
FIG. 5 is a block diagram illustrating components of a system suitable for implementing a multiple transaction interface framework, according to some example embodiments.

FIG. 5 is a block diagram illustrating components of a system 500 suitable for implementing a multiple transaction interface framework, according to some example embodiments.

The system 500 comprises the demilitarized zone ("DMZ") 505 and the intranet 555 connected by a network connection, e.g., a remote function call ("RFC") connection between the Generic Interaction layer ("GENIL") 516 of the CRM System-1 510 and the framework 528 of the CRM System-2 520. The DMZ 505 may be outside of a firewall protecting the intranet 555, may be available through the Internet, may be accessible by users to whom access to the intranet 555 is denied, or any suitable combination thereof. The intranet 555 may be a private security zone protected by a firewall, accessible through a virtual private network ("VPN"), be monitored for intrusions, or any suitable combination thereof.

The web UI 512 may interact with the business object layer ("BOL") 514 via RFC. Functionality may be provided in the enterprise resource planning ("ERP") system 530 rather than the CRM System-1 510, keeping protected data out of the DMZ 505. The communication from the CRM System-1 510 to the ERP system 530 may be facilitated by the CRM System-2 520.

In some example embodiments, it may be desirable to minimize the number of RFC calls from the GENIL 526 of the CRM System-2 520 to the ERP system 530. To facilitate this, when getting the details of an object (e.g., a document), a single RFC call may be made to retrieve all information regarding that particular object rather than several calls, each of which retrieves only a subset of the data pertaining to the object. The RFC connection used may have a generic communication user with a corresponding profile. The ERP system 530 may perform an authorization check of the generic communication user. The information on which the authorization check is performed may be provided in each RFC call made from the GENIL 526 of the CRM System-2 520 to the ERP system 530.

The RFC call to display or maintain a document may use Lean Order (LORD) frameworks 528, 538 in the CRM System-2 520 and the ERP system 530, respectively. The LORD frameworks 528, 538 may be RFC enabled by a generic wrapper function module.

A document (e.g., sales order, contract, quote, etc.) may be created in the ERP system 530 with data provided from the web UI 512 in the CRM System-1 510. The document may be passed via the internal CRM System-2 520 to the ERP system 530. In some example embodiments, there is no direct connection between the CRM System-1 510 in the DMZ 505 and the internal ERP system 530. The lack of a direct connection may provide enhanced security. The data may be stored centrally in ERP tables (e.g., lean order tables 539). In some example embodiments, the data is not stored in either the CRM System-1 510 or in the CRM System-2 520. There may be two generic RFC users used for communication purposes. One of the generic RFC users may be used for communications from the CRM System-1 510 to the CRM System-2 520. The second generic RFC user may be used for communications from the CRM System-2 520 to the ERP system 530. The CRM System-2 520 and the ERP system 530 may be located inside a firewall. The two generic users may have roles and profiles for creating transactional documents in the ERP system 530. Customizing data may be kept in the shared memory of the CRM System-1 510, which may enhance performance.

There may be different business events triggered in the CRM System-2 520 based on the data from the CRM System-1 510. The business logic may reside in the CRM System-2 520. The business events may include notification triggering, to inform one or more contact persons. The business events may include business rules execution.

Multiple web UI Components may be presented by web UI 512 and include ERP header, item, notes, organization management, partner, and attachments fields. The BOL 514 may handle data transfer between the web UI 512 and the CRM System-2 520 with the support of toolbox classes in the GENIL 516. The toolbox classes may call RFC function modules in CRM System-2 520 and ERP system 530. The toolbox class may have different methods to read and map the different sub-objects in transaction documents. The toolbox class may also have read and save methods. The RFC function modules of the CRM System-1 510 may call the LORD framework 528, which in turn may handle the read, modify, and save methods using the LORD framework 538.

Customizing details (e.g., status, categories, phases, date types, reason codes, text types, partner functions, process types, distribution channels, sales stages, priority, etc.) may be copied from the CRM System-2 520 to the CRM System-1 510 via a report program. Partner functions may describe business partners. A distribution channel may determine how goods are distributed to customers. Sales stages may identify the level of contact with the customer (e.g., cold call, first meeting, second meeting, etc.) or the progression of a sales contract (e.g., first offer, counter-offer, memorandum of understanding, request for proposal, letter of commitment, signed contract, etc.).

The report program may pull the customizing detail data from one or more tables in CRM System-2 520 (e.g., in the one order tables 529). The customizing details may be stored in a shared memory in the CRM System-1 510. In some example embodiments, the shared memory is populated once each day with a background job in the CRM System-1 510.

The web UI 512 may be filled with dropdown values taken from the shared memory in the CRM System-1 510. This may improve the application performance relative to implementations that fill the dropdown values by accessing the CRM System-2 520 or the ERP system 530. The validation business logic may reside in the CRM System-2 520, and may handle authorization checks, field checks (e.g., the presence of fields for a particular transaction), field validation checks (e.g., the validity of values for fields in a particular transaction), message handling, etc. After fields are entered in the web UI 512 and validation of the fields by the CRM System-2 520 is complete, the data may be saved in database tables in the ERP system 530.

The BOLs 514, 524 may provide business object layer functionality. For example, the BOLs 514, 524 may model business objects, relations, attributes, and searches; may provide access to business objects (e.g., create access, read-only access, modify access, delete access, or any suitable combination thereof); may communicate error and warning messages; may organize business objects (e.g., define aggregations of business objects, define associations of business objects, and track relationships between business objects such as subordinate, superordinate, root object, dependent object, and access object); and may buffer object models, business object properties, relations, and changes. In some example embodiments, the BOLs 514, 524 are memory and performance optimized.

The GENILs 516, 526 may use a GENIL object model that describes the inner structure of Business Objects (BOs), which may be an aggregation hierarchy lead by a root object. Each GENIL model object may be a business object node having flat structured attributes and be non-overlapping. In some example embodiments, the business object nodes do not contain data other than the flat structured attributes. Model objects may be connected via relations. Relations may be an aggregation/composition type, an association type, or both. In some example embodiments, aggregation and composition are only permitted between BO nodes of the same parent BO, while associations are also permitted to BO nodes of other parent BOs. In some example embodiments, the target object of an association must be an access object. A relation may be uni-directional with a defined source and target object. A target object may have multiple parents (e.g., one or more object type parents and one or more instance level parents). In some example embodiments, relations have no attributes. In some example embodiments, object and relation names must be unique in the whole model built from the models of the loaded components.

The web UI 522 of CRM System-2 520 may provide functionality to users that is similar to that provided by the web UI 512 of the CRM System-1 510. In some example embodiments, the difference between the web UI 522 and the web UI 512 is that the web UI 512 is available on a public network (e.g., the DMZ 505) while the web UI 522 is available on a private network (e.g., the intranet 555).

The web UI 532 on the ERP system 530 may provide the same functionality as the web UIs 512, 522, or may provide administrator functions for the ERP system 530. For example, the web UI 532 may provide a UI to allow manipulation of the lean order tables 539. The manipulation of the lean order tables 539 may be performed by accessing functions provided by the application protocol interface ("API") layer 534.

Figure 6:
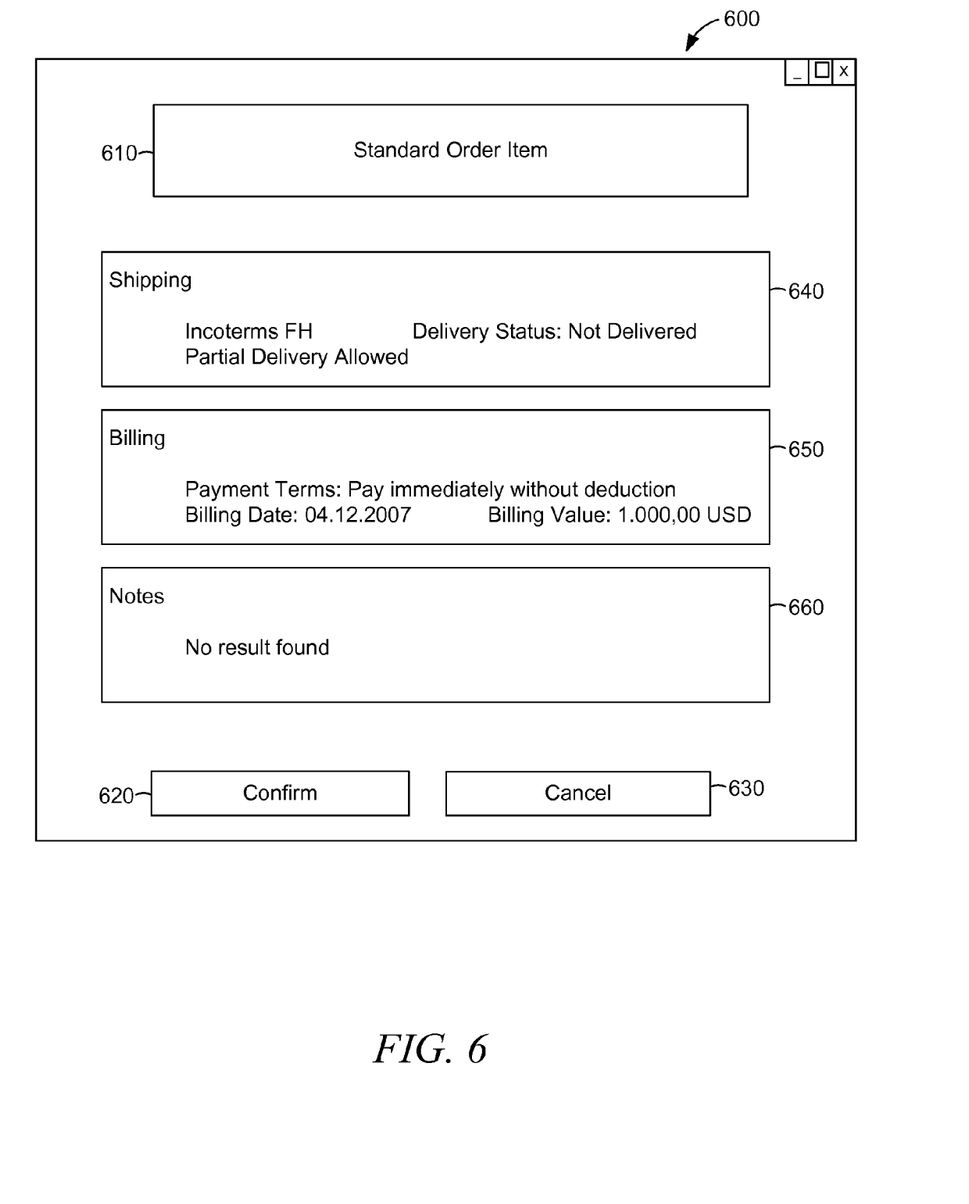
FIG. 6 is a block diagram illustrating a user interface in a system suitable for implementing a multiple transaction interface framework, according to some example embodiments.

FIG. 6 is a block diagram illustrating a user interface in a system suitable for implementing a multiple transaction interface framework, according to some example embodiments. FIG. 6 shows the user interface 600 including a title 610, detail windows 640, 650, and 660, and buttons 620 and 630. In some example embodiments, the UI 600 is presented by the UI module 210, 310, or 410, or the web UI 512, 522, or 532. The title 610 may inform the user of the object being viewed, the application being used, or any suitable combination thereof. The detail window 640 may display shipping information regarding the object. For example, the shipping information may include the terms of shipping and the delivery status. The detail window 650 may display billing information regarding the object. For example, the billing information may include the payment terms, the billing data, and the billing amount. The detail window 660 may include notes regarding the object. For example, the notes may be blank, may have been previously added by the user, may have been added by a different user, or any suitable combination thereof. Data presented in the detail windows 640, 650, 660 may have been obtained from the private machine 130, the restricted machine 120, or a shared memory in the public machine 110. In some example embodiments, the details shown in the detail windows 640, 650, and 660 are editable by the user. For example, some details may be selectable from a dropdown menu with options populated from a shared memory in the machine being accessed (e.g., the public machine 110, the restricted machine 120, or the private machine 130). The "confirm" button 620 may be operable to confirm edits made and submit them to the ERP system 530 for storage. The "cancel" button 630 may be operable to void the edits made.

Figure 7:
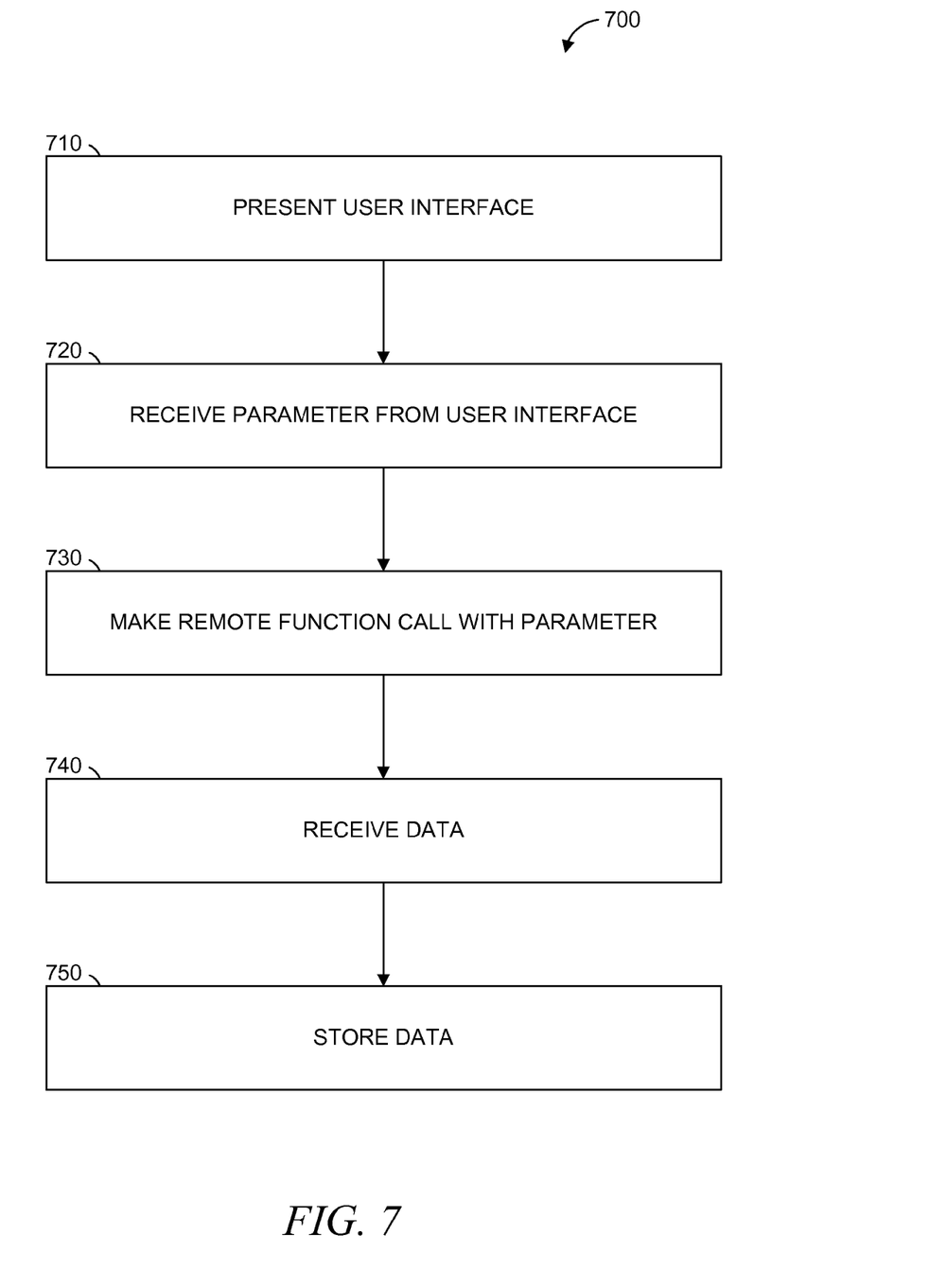
FIGS. 7-9 are flow diagrams illustrating operations of one or more devices in implementing a multiple transaction interface framework, according to some example embodiments.

FIG. 7 is a flow diagram illustrating operations of one or more devices in implementing a multiple transaction interface framework, according to some example embodiments. Operations in the method 700 may be performed by the public machine 110, using modules described above with respect to FIG. 2. As shown in FIG. 7, the method 700 includes operations 710, 720, 730, 740, and 750.

The method 700 may present a user interface to a user in operation 710 (e.g., send a web page using UI module 210 to a device 140, 150). The user interface may be operable to submit one or more parameters to the public machine 110. The public machine 110 may receive a parameter from the user interface (operation 720). After receiving the parameter, the public machine 110 may make a remote function call with the parameter (operation 730) (e.g., by using the network module 230 to make an RFC call to the restricted machine 120). The restricted machine 120 may respond to the RFC call with data. The public machine 110 may receive the responsive data (operation 740) and store the data (operation 750). In some example embodiments, the public machine 110 may update the user interface to present the data.

Figure 8:
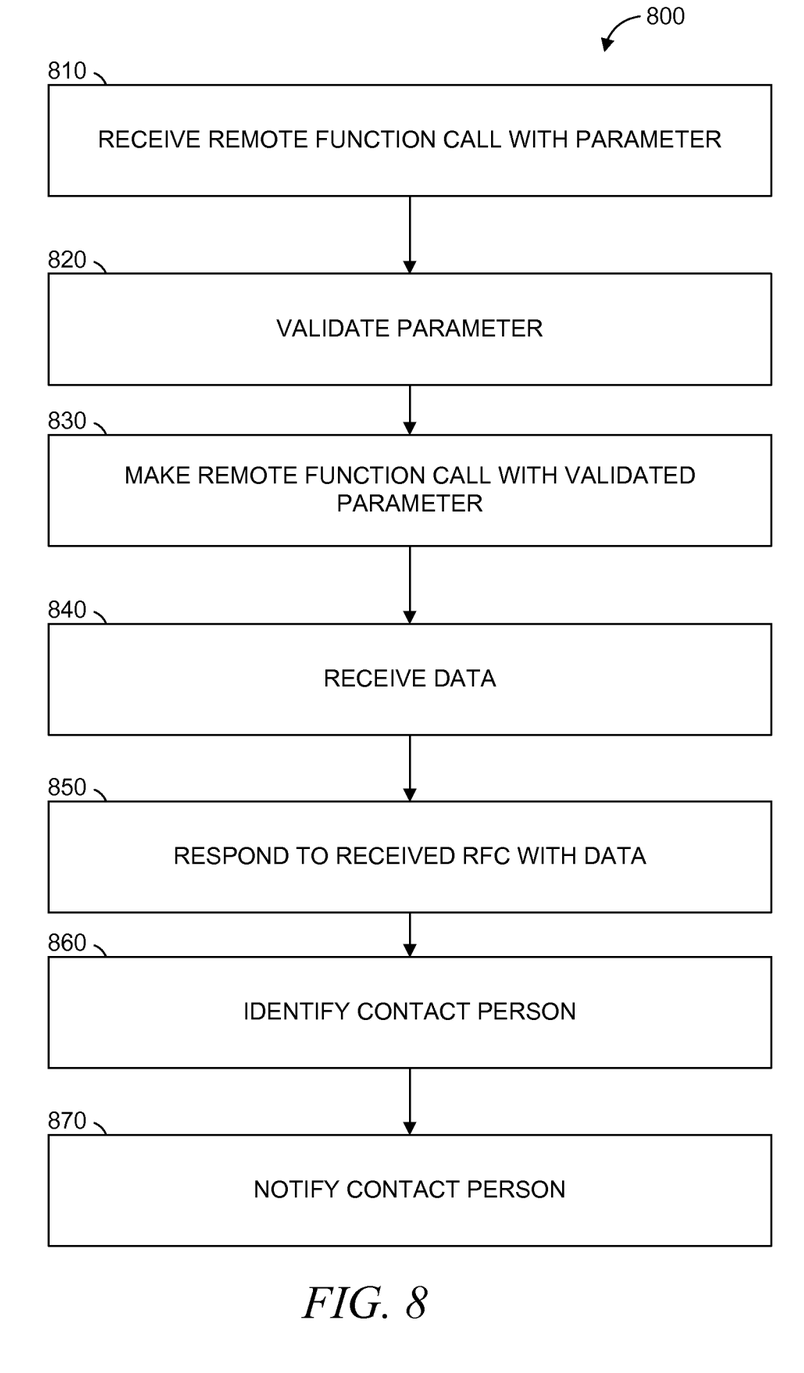

FIG. 8 is a flow diagram illustrating operations of one or more devices in implementing a multiple transaction interface framework, according to some example embodiments. Operations in the method 800 may be performed by the restricted machine 120, using modules described above with respect to FIG. 3. As shown in FIG. 8, the method 800 includes operations 810, 820, 830, 840, 850, 860, and 870.

The restricted machine 120 performing the method 800 may receive an RFC call with a parameter (operation 810) (e.g., with the network module 330). The RFC call may have originated from the public machine 110 performing the method 700. The restricted machine 120 may validate the parameter (operation 820) (e.g., by using the business module 320 to verify that the parameter is a valid parameter for the RFC call). After validating the parameter, the restricted machine 120 may make a corresponding RFC call to the private machine 130 (operation 830) using the validated parameter (e.g., using the business module 320). The private machine 130 may process the RFC call and respond with data. The restricted machine 120 may receive the data (operation 840) (e.g., using the network module 330). After receiving the data, the restricted machine 120 may respond to the RFC call received in operation 830 with the data (operation 850) (e.g., using the network module 330). Based on the RFC call, the business module 320 may identify a contact person (operation 860) (e.g., by retrieving the contact person using the data module 340 from the database 350). The restricted machine 120 may notify the contact person of the data access (operation 870) (e.g., via the network module 330).

Figure 9:
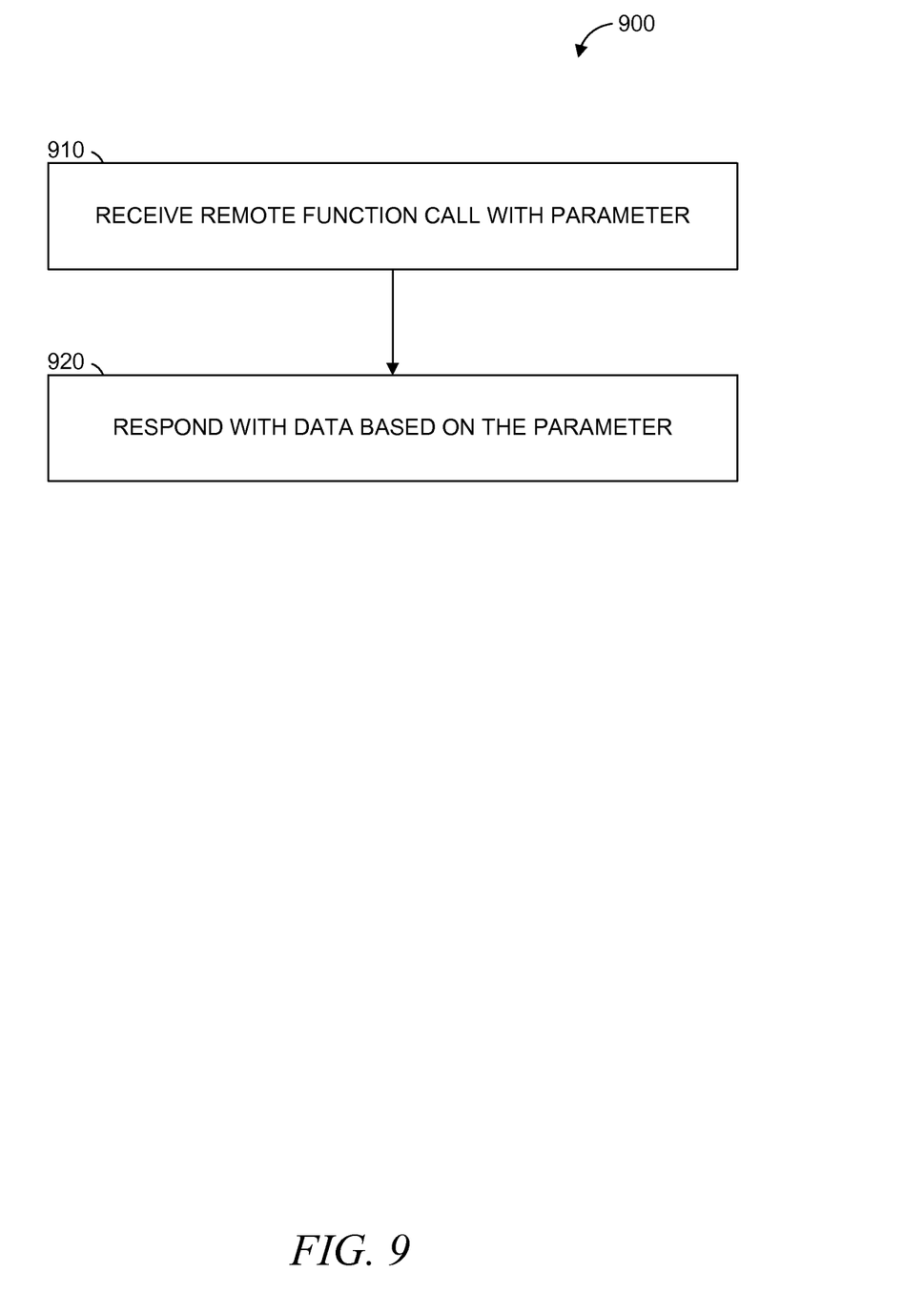

FIG. 9 is a flow diagram illustrating operations of one or more devices in implementing a multiple transaction interface framework, according to some example embodiments. Operations in the method 900 may be performed by the private machine 130, using modules described above with respect to FIG. 4. As shown in FIG. 9, the method 900 includes operations 910 and 920.

The private machine 130 performing the method 900 may receive an RFC call with a parameter (operation 910) (e.g., with the network module 430). The RFC call may have originated from the restricted machine 120 performing the method 800. The private machine 130 may process the RFC call and respond with data (operation 920) (e.g., by processing the request using the business module 420 to access data stored in the database 450 via the data module 440).

According to various example embodiments, one or more of the methodologies described herein may facilitate protected access to data stored in a private machine. Moreover, one or more of the methodologies described herein may facilitate reducing network traffic while providing protected access to data stored in a private machine.

When these effects are considered in aggregate, one or more of the methodologies described herein may obviate a need for certain efforts or resources that otherwise would be involved in accessing protected data. Efforts expended by an administrator in protecting data may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 10:
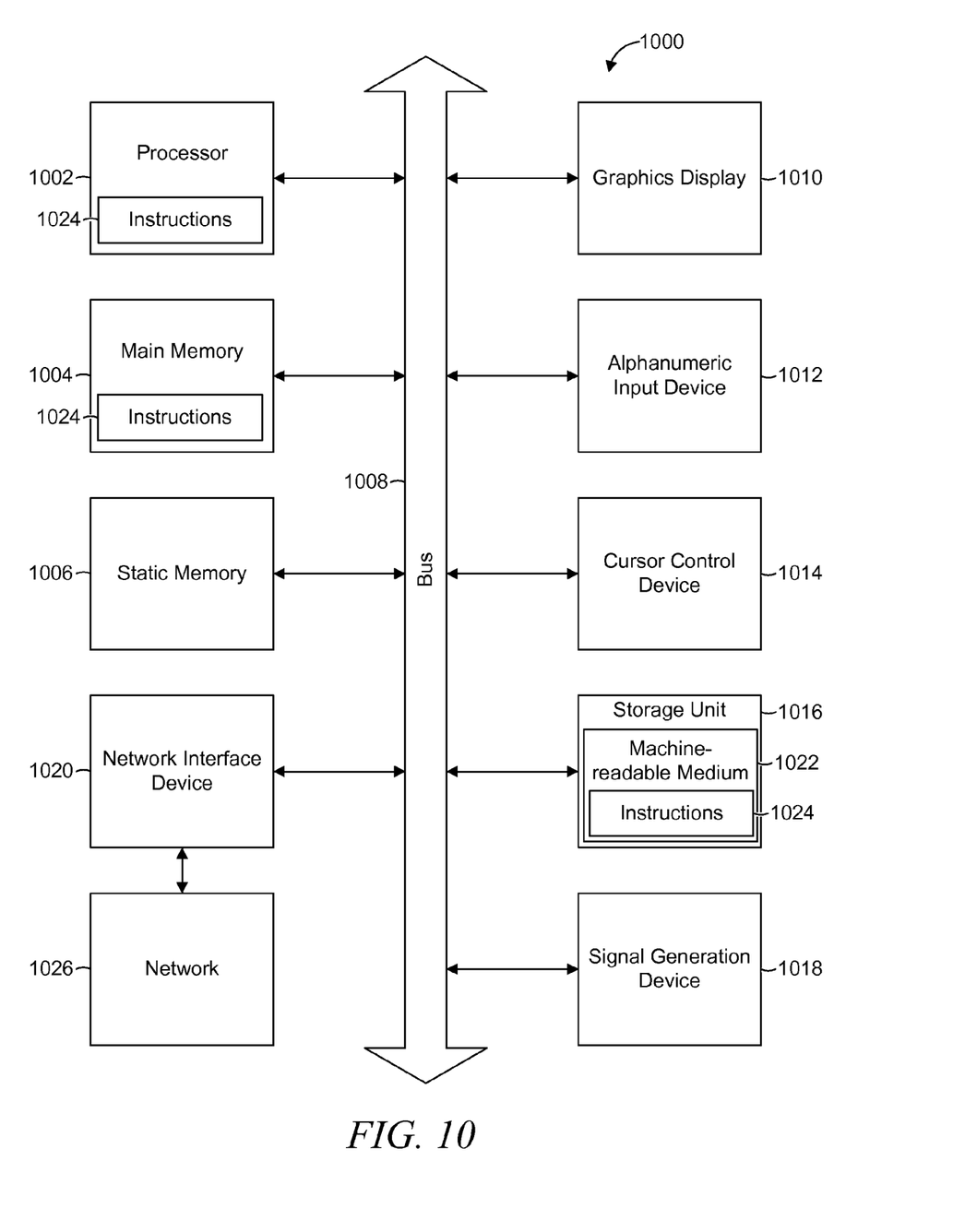
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system and within which instructions 1024 (e.g., software, a program, an application, an applet, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 190) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems (e.g., apparatus) discussed herein:

1. A system comprising:
a first system located in a private security zone inaccessible to a plurality of users, the first system comprising:
a memory;
a processor;
a framework coupled to the processor configured to:
receive remote function calls from a user of a second system located in a public security zone, the first system being accessible to the plurality of users; and
send remote function calls to a third system located in the private security zone, the third system being inaccessible to the user of the second system.

2. The system of description 1, wherein:
the second system is configured to cause a user interface to be presented to a user of the plurality of users, the user interface including data received from the first system.

3. The system of description 1 or description 2, wherein:
the first system is configured to respond to requests for the data from the second system by requesting the data from the third system, receiving the data from the third system, and sending the data to the second system; and
the third system is configured to store the data, and to respond to requests for the data from the first system by sending the data to the first system.

4. The system of any suitable one of descriptions 1-3, wherein:
the user interface is operable to:
indicate a parameter; and
cause a first remote function call to be sent from the second system to the first system, the first remote function call including the parameter; and
the first system is configured to:
respond to the first remote function call by validating the parameter.

5. The system of description 4, wherein:
the first system is configured to:
send a second remote function call to the third system, the second remote function call including the validated parameter.

6. The system of description 4 or description 5, wherein:
the second system is configured to:
store a result of the first remote function call.

7. The system of any of descriptions 4-6, wherein:
the first system is configured to:
identify a contact person based on the first remote function call; and
send a notification to the contact person based on the first remote function call.

8. The system of any of descriptions 1-7, wherein:
the second system comprises a shared memory containing data obtained from the first system, the shared memory populated daily.

9. A method comprising:
receiving a connection over a first network from a user of a first computing device while being inaccessible by a plurality of other users, the first computing device being accessible by the plurality of other users over the first network,
accessing a second computing device over a second network by a user, the second computing device being inaccessible by the user of the first computing device and the plurality of other users;
responding to a request for data from the first computing device by requesting the data from the second computing device, receiving the data from the second computing device, and sending the data to the first computing device;
receiving a response to the request for the data that includes the data; and
sending the data to the first computing device.

10. The method of description 9, wherein:
the second computing device is configured to cause a user interface to be presented to a user of the plurality of users, the user interface including the data.

11. The method of description 10, further comprising:
receiving a first remote function call from the second computing device, the first remote function call including a parameter generated by the user interface;

12. The method of description 11, further comprising
responding to the first remote function call by validating the parameter.

13. The method of description 12, further comprising:
sending a second remote function call to the second computing device, the second remote function call including the validated parameter.

14. The method of any of descriptions 10-13, wherein:
the first computing device is configured to store a result of the first remote function call in a memory.

15. The method of any of descriptions 10-14, further comprising:
identifying a contact person based on the first remote function call; and
sending a notification to the contact person based on the first remote function call.

16. A non-transitory machine-readable storage medium comprising instructions that, when executed by one or more processors of a machine, cause the machine to perform operations comprising:
responding to a request for data from a first computing device over a first network by requesting the data from a second computing device over a second network, receiving the data from the second computing device, and sending the data to the first computing device.

17. The non-transitory machine-readable storage medium of description 16, wherein the operations further comprise:
responding to a first remote function call by validating a parameter of the first remote function call.

18. The non-transitory machine-readable storage medium of description 17, wherein the operations further comprise:
sending a second remote function call to the second computing device, the second remote function call including the validated parameter.

19. The non-transitory machine-readable storage medium of any of descriptions 16-18, wherein the operations further comprise:
identifying a contact person based on the first remote function call.

20. The non-transitory machine-readable storage medium of description 19, wherein the operations further comprise:
sending a notification to the contact person based on the first remote function call.

What is claimed is:

1. A system comprising:
a first system located in a private security zone inaccessible to a plurality of computing devices, the first system comprising:
a framework implemented by at least one processor configured to:
receive a first remote function call associated with a first generic user, via a first network, from a second system located in a public security zone, the second system being accessible to the plurality of computing devices via a second network, the second system being configured to provide a user interface to a computing device of the plurality of computing devices, the user interface including data received from the first system and processed by the second system;
perform an authorization check on the first generic user based on data included in the first remote function call; and
send a second remote function call associated with a second generic user, via the first network, to a third system located in the private security zone, the third system being inaccessible via the second network, the second remote function call corresponding to the first remote function call.

2. The system of claim 1, wherein:
the second system comprises a shared memory containing data obtained from the first system, the shared memory populated daily.

3. The system of claim 1, wherein:
the first system is configured to respond to requests for the data from the second system by requesting the data from the third system, receiving the data from the third system, and sending the data to the second system; and
the third system is configured to store the data, and to respond to requests for the data from the first system by sending the data to the first system.

4. The system of claim 3, wherein:
the user interface is operable to indicate a parameter; and
the first remote function call includes the parameter; and
the first system is configured to:
respond to the first remote function call by validating the parameter.

5. The system of claim 4, wherein:
the second remote function call includes the validated parameter.

6. The system of claim 4, wherein:
the second system is configured to:
store a result of the first remote function call.

7. The system of claim 4, wherein:
the framework of the first system is further configured to:
identify a contact person based on the first remote function call; and
send a notification to the contact person based on the first remote function call.

8. A non-transitory machine-readable medium having instructions embodied thereon, which, when executed by one or more processors of a first machine, cause the first machine to perform operations comprising:
receiving a first remote function call associated with a first generic user, via a first network, from a second machine located in a public security zone, the second machine being accessible to a plurality of computing devices via a second network, the second machine being configured to provide a user interface to a computing device of the plurality of computing devices, the user interface including data received from the first system and processed by the second machine, the first machine being inaccessible to the plurality of computing devices and in a private security zone;
performing an authorization check on the first generic user based on data included in the first remote function call; and
sending a second remote function call associated with a second generic user, via the first network, to a third machine located in the private security zone, the third machine being inaccessible via the second network, the second remote function call corresponding to the first remote function call.

9. The non-transitory machine-readable medium of claim 8, wherein:
the second machine comprises a shared memory containing data obtained from the first machine, the shared memory populated daily.

10. The non-transitory machine-readable medium of claim 8, wherein the operations further comprise:
responding to requests, from the second machine, for the data by requesting the data from the third machine, receiving the data from the third machine, and sending the data to the second machine.

11. The non-transitory machine-readable medium of claim 10, wherein:
the user interface is operable to indicate a parameter; and
the first remote function call includes the parameter; and
the operations further comprise:
responding to the first remote function call by validating the parameter.

12. The non-transitory machine-readable medium of claim 11, wherein
the second remote function call includes the validated parameter.

13. The non-transitory machine-readable medium of claim 11, wherein:
the second system is configured to:
store a result of the first remote function call.

14. The non-transitory machine-readable medium of claim 11, wherein the operations further comprise:
identifying a contact person based on the first remote function call; and
sending a notification to the contact person based on the first remote function call.

15. A method, performed by a first machine, comprising:
receiving a first remote function call associated with a first generic user, via a first network, from a second machine located in a public security zone, the second machine being accessible to a plurality of computing devices via a second network, the second machine being configured to provide a user interface to a computing device of the plurality of computing devices, the user interface including data received from the first system and processed by the second machine, the first machine being inaccessible to the plurality of computing devices and in a private security zone;
perform an authorization check on the first generic user based on data included in the first remote function call; and
sending a second remote function call associated with a second generic user, via the first network, to a third machine located in the private security zone, the third machine being inaccessible via the second network, the second remote function call corresponding to the first remote function call.

16. The method of claim 15, further comprising:
responding to requests, from the second machine, for the data by requesting the data from the third machine, receiving the data from the third machine, and sending the data to the second machine.

17. The method of claim 16, wherein:
the user interface is operable to indicate a parameter;
the first remote function call includes the parameter; and
the method further comprises:
responding to the first remote function call by validating the parameter.

18. The method of claim 17, wherein:
the second remote function call includes the validated parameter.

19. The method of claim 17, wherein the second system is configured to store a result of the first remote function call.

20. The method of claim 17, further comprising:
identifying a contact person based on the first remote function call; and
sending a notification to the contact person based on the first remote function call.

* * * * *